United States Patent Office 3,483,150
Patented Dec. 9, 1969

3,483,150
POLYURETHANE PREPOLYMERS AND ELASTOMERS
Arthur Ehrlich, 393 Rockaway Parkway, Brooklyn, N.Y. 11212; John W. Hayes, 47 Stevens Ave., West Long Branch, N.J. 07764; and Temple C. Patton, 105 Oxford Terrace, Westfield, N.J. 07090
No Drawing. Filed Feb. 15, 1967, Ser. No. 616,174
Int. Cl. C08g 22/06
U.S. Cl. 260—18   30 Claims

ABSTRACT OF THE DISCLOSURE

An isocyanate terminated liquid prepolymer composition which comprises the reaction product of (1) at least one polyfunctional compound containing active hydrogen groups, (2) a low viscosity or solid polyfunctional isocyanate having a functionality between about 2 and 3, and an isocyanate equivalent weight between 75 and 250; this polyfunctional isocyanate is derived from the reaction of aniline and formaldehyde, and (3) an arylene diisocyanate; and elastomers obtained from these prepolymers by reacting the prepolymer with at least one polyfunctional compound containing active hydrogens as determined by the Zerewitinoff method. In formation of the prepolymer, reactants (1) and (3) are first reacted followed by addition of material (2).

BACKGROUND OF THE INVENTION

Field of the invention

This invention relates to polyurethane prepolymer compositions and elastomers obtained by curing the prepolymer with a polyfunctional curing composition containing active hydrogen groups.

Description of the prior art

The reaction of arylene diisocyanates and in particular tolylene diisocyanate with polyfunctional compounds containing active hydrogen groups to produce urethane prepolymers and elastomers is well known. These urethane elastomers are used among other things for potting, filing, embedding and encapsulating electronic circuits, components and power systems. Many of the heretofore known polyurethane elastomers suffer from numerous deficiencies which have severely restricted their commercial application. For example, many heretofore utilized elastomers exhibit low tensile strength. Such low tensile strength is a serious disadvantage when the product is used as an adhesive, coating or encapsulant, since upon continued handling it tends to break, flake off or be pulled away from the substrate. Another problem frequently encountered with prior art urethane elastomers is excessive foaming and shrinking during curing of the prepolymer. Moreover, on curing many heretofore known urethane prepolymers have exhibited a substantially high exotherm which adversely affects temperature sensitive equipment.

SUMMARY OF THE INVENTION

Accordingly, one aspect of the present invention is to provide urethane elastomers having (a) good electrical properties as determined by the dielectric constant and dissipation factor, the dielectric properties being equal to or better than epoxy and styrene-polyester compounds, (b) little cure shrinkage, (c) excellent shock absorption, (d) high hardness and mechanical strength with a low stress at room temperature down to −40° C., (e) high heat stability, (f) low exotherm on curing, (g) better handling properties such as less sensitivity to moisture and consequent gasing, (h) reduced toxicity of the prepolymer due to less unreacted tolylene diisocyanate, (i) better storage stability, and (j) good physical properties such as resistant to the effect of moisture, low moisture absorp and markedly improved tensile strength.

Another aspect of the present invention is to provide novel urethane prepolymers which comprise the reaction product of at least one polyfunctional compound containing active hydrogens with an arylene diisocyanate and a low viscosity or solid polyfunctional isocyanate derived from the reaction of aniline and formaldehyde and having a functionality between 2 and 3.

The foregoing aspects of this invention as well as others will become apparent as the description proceeds.

Basically, the prepolymers of the present invention comprise the reaction product of (1) at least one polyfunctional compound containing active hydrogen groups, (2) a low viscosity or solid polyfunctional isocyanate having a functionality between 2 and 3 and derived from the reaction product of aniline and formaldehyde, and (3) an arylene diisocyanate, the process being carried out at a temperature between about 25° C. and 125° C.

In the formation of the prepolymers any arylene diisocyanate may be used which is known in the art to be useful in the preparation of urethane prepolymers. Tolylene diisocyanate (including its various isomers) is the preferred arylene diisocyanate but others are contemplated including m-phenylene diisocyanate, xylene 4,4' diisocyanate, naphthalene 1, 5 diisocyanate, diphenylene 4,4' diisocyanate, diphenylether 4,4' diisocyanate, and 1-chlorophenylene 2,4 diisocyanate, etc. The tolylene diisocyanate comprises about from 10 to 50% by weight of the prepolymer composition. However, if desired, a highly useful prepolymer composition can also be obtained by omitting the arylene diisocyanate and merely reacting the low viscosity or solid polyfunctional isocyanate derived from the reaction of aniline and formaldehyde, described hereafter, and at least one polyfunctional compound containing active hydrogen groups.

The low viscosity polyfunctional isocyanate employed in the compositions of the present invention have a viscosity ranging from about 5 cps. to about 600 cps., preferably between about 30 cps. and about 300 cps., a functionality ranging between about 2 and 3, and an isocyanate equivalent about 125 and 145. These materials which are commercially available are derived from the reaction of aniline and formaldehyde. Illustrative of these polyfunctional isocyanates are polymethylene polyphenyl isocyanate equivalent weight of between about 75 and 250, preferably between about 125 and 145. These materials and 2.8 and a modified methylene bis phenyl isocyanate, the preparation of which is described in Belgian Patent 678,773. This material is prepared by reacting methylene diphenylene isocyanate in the presence of a trialkyl phosphate catalyst at a temperature of 160° to 250° C. Other polyfunctional isocyanates can also be employed having a functionality between 2 and 3. A solid polyfunctional isocyanate that may be used is a diphenylmethane isocyanate having a functionality of 2.

In the formation of the prepolymer compositions at least one polyol, and preferably two are employed from the class consisting of: (a) glycol, polyglycol and other polyhydric alcohol mono- and di-esters of hydroxy carboxylic acids of at least 12 carbon atoms, which may be prepared by reacting a hydroxy carboxylic acid of at least 12 carbon atoms with polyhydric lower aliphthatic alcohols (di, tri, and higher alcohols) or ether alcohols, such as ethylene glycol, glycerine, propylene glycol, hexylene glycol, diethylene glycol, sucrose, sorbitol, dipropylene glycol, hexamethylene glycol, and polyethylene and poly propylene glycols, according to procedures well known in the prior art such as direct esterification. The hydroxy carboxylic acids may be saturated or unsaturated. Illustrative of this class of hydroxy acids are the following: ricinoleic, acid, 12-hydroxy stearic acid, hydroxy palmitic acid, hydroxy pentadecanoic acid, hydroxy myristic acid, hydroxy docosanoic acid, hydroxy cerotic acid, etc. The length of the carbon chain of the hydroxy carboxylic acids is limited only to the extent that commercially there are available carboxylic acids having about twenty-two carbon atoms. However, hydroxy carboxylic acids having more than twenty-two carbon atoms are also contemplated.

The preferred esters are propylene glycol monoricinoleate, ethylene glycol monoricinoleate, and propylene glycol 12-hydroxy stearate. Among the other esters which are useful in the preparation of the prepolymers include diethylene glycol monoricinoleate, glyceryl mono- and diricinoleates, polyethylene glycol monoricinoleate, dipropylene glycol 12-hydroxy stearate, propylene glycol hydroxy palmitate, etc.; (b) a castor oil which may be any commercial grade of castor oil. The preferred grade is a low acid, low volatile grade available commercially as "DB" castor oil from The Baker Castor Oil Company; (c) polyalkylene glycols and polyalkylene ethers of trihydroxy compounds. Illustrative polyalkylene glycols are polypropylene glycol, polyethylene glycol and mixtures thereof having a molecular weight between about 200 and 2000. Examples of suitable polyalkylene ethers of trihydroxy compounds are glyceryl-polypropylene ethers, glyceryl-polyethylene ethers, etc., having a molecular weight between about 200 and 2000 and preferably above 400.

The preferred prepolymers of this invention contain at least one of the aforedescribed polyols and comprise (1) zero to about 50 parts by weight of castor oil, (2) about 10 to 50 parts by weight of an arylene diisocyanate, e.g. tolylene diisocyanate, (3) zero to about 15 parts by weight of a glycol or polyglycol monoester of a hydroxy carboxylic acid of at least 12 carbon atoms described above, (4) zero to about 30 parts by weight of a polyalkylene glycol and/or polyalkylene ether of a trihydroxy compound described above, and (5) from about 10 to 70 parts by weight of a low viscosity or solid polyfunctional isocyanate derived from the reaction of aniline and formaldehyde as previously described. The total amount of polyol in the prepolymer should not exceed a weight which will reduce the isocyanate to hydroxyl equivalent weight ratio below 2 to 1; usually not more than 70% by weight in the prepolymer.

The prepolymer compositions may have a viscosity as high as 50,000 cps. and preferably between about 100 cps. and about 5,000 cps. An NCH/OH ratio of 2:1 to 20:1 results in satisfactory prepolymers.

While the above described polyfunctional compounds containing active hydrogen groups are preferred, other compounds heretofore employed in the art for making urethane prepolymers such as polyamides and polyesters are also suitable. The polyesters can be prepared by the reaction of two polyfunctional reactants, one being a dibasic carboxylic acid and the other a glycol. The polyester amides of the present invention can be prepared by the reaction of a dibasic carboxylic acid with diamines or amino alcohols.

Illustrative of disbasic carboxylic acids that may be used in the preparation of the polyesters and polyester amides include succinic, glutaric, adipic, pimelic, maleic, malconic, fumaric, terephthalic, citric, etc. Among the glycols which may be reacted with these acids to obtain a polyester are ethylene glycol, propylene glycol, 1,3 tolylene glycol, triethylene glycol, butylene glycol, hexamethylene glycol, decamethylene glycol and glycerine monoethers. Among the diamines useful for obtaining the polyester amides are those which contain at least one primary amino group such as ethylene diamine, propylene diamine, tetramethylene diamine, m-phenylene diamine and 3,3'-diamino dipropyl ether. Primary amino alcohols useful in the formation of polyamides include 3-amino-propanol, 6-aminohexanol, 4-amino-butanol, etc.

Useful prepolymers can also be obtained by omitting tolylene diisocyanate. These prepolymers which omit tolylene diisocyanate comprise the reaction product of about 5 to 50 parts by weight of at least one of the polyfunctional compounds containing active hydrogen groups heretofore described and about 50 to 95 parts by weight of a low viscosity or solid polyfunctional isocyanate derived from the reaction of aniline and formaldehyde previously described. In this prepolymer system, in order to obtain a workable viscosity the minimum NCO/OH ratio is about 2.5:1 and preferably above 5:1. The viscosity of these prepolymers should be between about 500 cps. and 50,000 cps. and preferably between about 500 cps. and 5,000 cps.

The prepolymers of this invention are cured to elastomers by adding to the prepolymer at least one curing agent comprising a material containing two or more active hydrogen groups. The preferred curing agent is selected from the class consisting of (a) esters of polyhydric alcohols containing at least four hydroxy groups and an aliphatic acid of at least 12 carbon atoms and one or more hydroxy and/or epoxy groups per molecule, (b) a glycol, glyceryl or a polygycol mono- or di-ester of a hydroxy carboxylic acid of at least 12 carbon atoms, (c) polyalkylene glycols such as polypropylene glycol having a molecular weight between 200 and 2,000 and (d) mixtures of the materials described in (a), (b) and (c).

The hydroxy and/or epoxy aliphatic acids of at least 12 carbon atoms that form an ester, when reacted with polyhydric alcohols of at least four hydroxy groups, may be saturated or unsaturated. Illustrative of this class of hydroxy acids are the following: ricinoleic acid, 12-hydroxy stearic acid, hydroxy palmitic acid, hydroxy cerotic acid, as well as epoxy derivatives of these acids. The length of the carbon chain of the hydroxy and/or epoxy aliphatic acids is limited only to the extent that commercially there are available aliphatic acids having about 22 carbon atoms. However, hydroxy aliphatic acids having more than 22 carbon atoms are also contemplated.

Among the polyhydric alcohols, containing at least four hydroxy groups, that may be reacted with the hydroxy and/or epoxy aliphatic acid to form an ester are the following: pentaerythritol, erythritol, arabitol, mannitol, sorbitol, sucrose and cellulose.

The esters which are useful as curing agents for the prepolymers are prepared according to known procedures in the art such as direct esterification resulting from reaction of a hydroxy and/or epoxy aliphatic acid with a polyhydric alcohol containing at least four hydroxy groups. Other well known processes for producing esters can also be employed. The preferred curing agent for the prepolymers is pentaerythritol monoricinoleate whose preparation is disclosed in copending application Ser. No. 446,719 filed Apr. 8, 1965. Other esters which can be used include pentaerythritol 12-hydroxy stearate, sorbitol monoricinoleate, erythritol monoricinoleate, cellulose hydroxy stearate, as well as any other esters which would result from the reaction of the above enumerated polyhydric alcohols and hydroxy aliphatic acids.

Also contemplated are diesters, triesters and tetraesters such as pentaerythritol diricinoleate, pentaerythritol triricinoleate, pentaerythritol tetraricinoleate, etc.

The glycol and polyglycol esters of hydroxy carboxylic acids of at least 12 carbon atoms are those which have heretofore been described as one of the preferred class of polyols for obtaining the prepolymers of this invention.

Other conventional curing agents known in the art for reaction with urethane prepolymers may be employed in combination with the preferred curing materials heretofore described or even substituted therefor. Among the typical compounds containing active hydrogen groups which will react with the prepolymers to give elastomers having excellent electrical and physical properties, are alcohols, amines, glycol monoesters of carboxylic acids, polyesters, polyester amides and polyalkylene glycols.

Among the alcohols which are useful for curing the prepolymers of this invention are dihydric and ether alcohols, preferably aliphatic alcohols. Illustrative of these alcohols are the following: propylene glycol, ethylene glycol, hexylene glycol, dipropylene glycol, hexamethylene glycol, butanediol-1,3, as well as other dihydric and polyether alcohols having active hydrogens.

Among the polyesters which may be employed are those obtained from the reaction of any dibasic carboxylic acid, containing at least 3 carbon atoms with dihydric alcohols and ether alcohols. Illustrative of these acids are the following: succinic, glutaric, adipic, pimelic, malonic, fumaric, etc. Any glycol may be used in the formation of the polyesters including ethylene glycol, propylene glycol, pentamethylene glycol, etc. The polyester amides can be prepared by the reaction of any dibasic carboxylic acid containing at least 3 carbon atoms with an amino alcohol or diamine. Examples of amino alcohols that may be employed include ethanolamine, 3-amino propanol, 6-amino hexanol, etc. Diamines include ethylene diamine, propylene diamine, 1,4 hexamethylene diamine, etc.

Further, castor oil and its derivatives may also be employed alone or in combination with other polyols as a curing agent for the prepolymers of this invention.

The amines that are useful for curing the prepolymers are those having active hydrogens such as primary and secondary organic diamines. Included are aliphatic, cyclic, aromatic, aralkyl and alkaryl diamines. Illustrative of some of these diamines which fall within the scope of this invention are the following: laurylguanamine, 4,4'-methylene-bis-(2-chloroaniline), 3,3' dichloro-4,4'-diamino-diphenyl-methane, 3,3' dichlorobenzidine, ethylene diamine, diethylene triamine, 4,4' diamino biphenyl, phenethyl diamine. Other polyols not enumerated above are equally effective for curing the prepolymers as long as they meet the requirements of having active hydrogen groups for reaction with the free isocyanate groups.

The amount of curing composition reacted with the prepolymer should be sufficient to react with the free isocyanate groups remaining after the preparation of the prepolymer, but preferably not in too low an amount or too much in excess. A low amount of such curing composition tends to render the elastomer too hard and increases the cost of the product, whereas an excess of the curing composition causes it to act as a plasticizer, and this is frequently undesirable. The amount of curing agent required to react properly with the prepolymer can be determined by the following calculations:

Parts of curing agent for 100 parts of prepolymer=

$$\frac{1,335 \times \text{percent NCO (isocyanate) of prepolymer}}{\text{hydroxyl value} + \text{acid number of curing agent}}$$

Excellent elastomers have been obtained when using about ten to ninety parts by weight of a glycol or polyglycol monoester of a hydroxy carboxylic acid of at least twelve carbon atoms as previously described (e.g. propylene glycol monoricinoleate), zero to forty parts by weight of pentaerythritol monoricinoleate or related compound previously described and zero to about 40 parts by weight of polypropylene glycol. Another curing composition resulting in good elastomeric products is a mixture of castor oil and a polyalkylene ether of glycerin.

The electrical properties and hydrolytic stability of the elastomers can be further improved by including in the curing composition up to about forty parts by weight of an epoxidized unsaturated vegetable oil e.g. soybean oil, obtained by reaction with a peracid. Such oils contain from about 1 percent to 90% epoxy linkages. Epoxy resins such as Bisphenol A, epichlorohydrin and epoxy esters, e.g. butyl isooctyl epoxy stearate, may also be used to improve electrical properties and hydrolytic stability.

It is also frequently useful to add a non-reactive ingredient to the elastomeric product as part of the final step to change the physical properties, reduce cost and/or plasticize the elastomer. Among materials which have been found useful for this purpose are: chlorinated biphenyls, chlorinated paraffin and polyphenyls, hydroxylated rosin, dioctyl phthalate, diisooctyl phthalate, dioctylsebacate, acetylated glyceride of 12-hydroxystearic acid and fillers such as calcium carbonate and silica. Other fillers and non-reactive diluents useful in the art may also be added to change specific properties and lower costs.

The step of converting the prepolymer with a curing agent to an elastomeric product may be carried out at room temperature, or elevated temperature (e.g. 50° C. to 150° C.). If it is desired to carry out the reaction at room temperature, it is expedient to add a catalyst to speed up the reaction. Suitable catalysts are various organic amines such as dimethylaminoethanol, triethylene diamine, triethyl amine, tetramethyl butanediamine or tin salts such as stannous octoate or dibutyl tin dilaurate.

The following examples are illustrative of the preparation of the prepolymers of the present invention.

Example 1

The prepolymer is formed in a vessel by mixing 21.8 parts by weight tolylene diisocyanate (80/20) with 14.10 parts by weight of a polypropylene glycol having a molecular weight of about 400 and this mixture is allowed to exotherm for about one half hour and the temperature not allowed to exceed 60° C. The temperature of the mixture is then maintained at 60° with stirring for an additional hour. If necessary, cooling or heating of the mixture may be required to maintain this desired temperature. To this mixture there is slowly added 7.05 parts by weight "DB" castor oil and 7.05 parts by weight of propylene glycol monoricinoleate. By resorting to cooling and/or heating as becomes necessary the temperature of the mixture is continually maintained at 60° C. for an additional hour while stirring the mixture.

To the above described mixture there is then added 50 parts by weight of a polymethylene polyphenyl isocyanate containing about 70% methylene bis (phenyl isocyanate). This material has an average functionality of 2.3 to 2.6, an overall isocyanate equivalent weight of about 130, a viscosity (25° C.) of 50 cps. and a specific gravity of 1.2. Mixing is continued until a homogeneous mixture is obtained. The resulting prepolymer has a viscosity of 1640 cps.

In the following Examples 2 through 4 a prepolymer was prepared following the procedure of Example 1 and using the same process conditions but omitting at least one of the polyols employed in that example.

Example 2

| | Parts by weight |
|---|---|
| "DB" castor oil | 7.05 |
| Propylene glycol monoricinoleate | 7.05 |
| Tolylene diisocyanate (80/20) | 21.80 |
| Polymethylene polyphenyl isocyanate (same as in Example 1) | 50.00 |

This prepolymer has a viscosity of 150 cps.

Example 3

| | Parts by weight |
|---|---|
| Polypropylene glycol (400 M.W.) | 14.10 |
| Propylene glycol monoricinoleate | 7.05 |
| Tolylene diisocyanate (80/20) | 21.80 |
| Polymethylene polyphenyl isocyanate (same as in Example 1) | 50.00 |

This prepolymer has a viscosity of 600 cps.

Example 4

| | Parts by weight |
|---|---|
| "DB" castor oil | 7.05 |
| Polypropylene glycol (400 M.W.) | 14.10 |
| Tolylene diisocyanate (80/20) | 21.80 |
| Polymethylene polyphenyl isocyanate (same as in Example 1) | 50.00 |

This prepolymer has a viscosity of 450 cps.

In Examples 5 through 7 a prepolymer was prepared following the procedure of Example 1 and using the same process conditions but using only one polyol and the polyfunctional isocyanate derived from the reaction of aniline and formaldehyde.

Example 5

| | Parts by weight |
|---|---|
| "DB" castor oil | 23 |
| Polymethylene polyphenyl isocyanate (same as in Example 1) | 77 |

This prepolymer has a viscosity of 1980 cps.

Example 6

| | Parts by weight |
|---|---|
| "DB" castor oil | 34.2 |
| Polymethylene polyphenyl isocyanate (same as in Example 1) | 67.5 |

This prepolymer has a viscosity of 15,720 cps.

Example 7

| | Parts by weight |
|---|---|
| "DB" castor oil | 34.2 |
| Polymethylene polyphenyl isocyanate (same as in Example 1) | 40.5 |

This prepolymer has a viscosity of 3040 poise. This viscosity is too high to obtain a useful elastomer.

The following prepolymers were also obtained following the procedure of Example 1 and using the same process conditions as described in that example.

Example 8

| | Parts by weight |
|---|---|
| "DB" castor oil | 7.05 |
| Propylene glycol monoricinoleate | 7.05 |
| Polypropylene glycol (400 M.W.) | 14.10 |
| Tolylene diisocyanate (80/20) | 21.8 |
| Diphenylmethane isocyanate (functionality of 2) | 50.0 |

This prepolymer has a viscosity of 500 cps.

Example 9

| | Parts by weight |
|---|---|
| "DB" castor oil | 7.05 |
| Propylene glycol monoricinoleate | 7.05 |
| Polypropylene glycol (400 M.W.) | 14.10 |
| Tolylene diisocyanate (80/20) | 21.80 |
| Modified methylene bis (phenyl isocyanate)[1] having a functionality of about 2.3 and an equivalent weight of 144 | 50.00 |

[1] See Belgian Patent 678,773 for method of preparation.

This prepolymer has a viscosity of 1440 cps.

Example 10

| | Parts by weight |
|---|---|
| "DB" castor oil | 7.05 |
| Propylene glycol monoricinoleate | 7.05 |
| Polypropylene glycol (400 M.W.) | 14.10 |
| Tolylene diisocyanate (80/20) | 21.80 |
| Polymethylene polyphenyl isocyanate (functionality of 2.7 to 2.8) | 50.00 |

This prepolymer has a viscosity of 3900 cps.

Example 11

| | Parts by weight |
|---|---|
| Polypropylene ether of glycerin (1000 M.W.) | 23.00 |
| Polymethylene polyphenyl isocyanate (same as in Example 1) | 77.00 |

This prepolymer has a viscosity of 2150 cps.

Example 12

| | Parts by weight |
|---|---|
| "DB" castor oil | 23 |
| Diphenylmethane isocyanate (functionality of 2) | 77 |

This prepolymer has a viscosity of 7430 cps.

The following prepolymer was obtained following the procedure of Example 1 except that the temperature was maintained at 130° C. rather than 60° C.

Example 13

| | Parts by weight |
|---|---|
| "DB" castor oil | 23 |
| Polymethylene polyphenyl isocyanate (same as in Example 1) | 77 |

This prepolymer has a viscosity of 3440 cps.

The following prepolymer was prepared to determine the effect of omitting the polyfuctional isocyanate derived from the reaction of aniline with formaldehyde. The same process conditions were used as in Example 1.

Example 14

| | Parts by weight |
|---|---|
| "DB" castor oil | 7.05 |
| Propylene glycol monoricinoleate | 7.05 |
| Polypropylene glycol (400 M.W.) | 14.10 |
| Tolylene diisocyanate (80/20) | 71.8 |

This prepolymer has a viscosity of 104 cps.

*Procedure for the heat cure.*—The prepolymers of Examples 1 through 14 and selected curing compositions are first placed separately in a vacuum over and degassed at 50–60° C. for 10 to 30 minutes at 5 mm. mercury pressure or at least until the foam, which initially appears, collapses. At the end of the designated period, the vacuum is broken and the correct amount of curing agent is added to the preparation to effect the cure. After thoroughly mixing the reactants until homogeneous the prepolymer curing agent mixture is re-evacuated at 60° C. for 2 to 3 minutes at 5 mm. mercury pressure to remove air introduced during the mixing. The degassed mixture is then poured into molds and cured for about 6 hours at 80° C. The curing can be also initially commenced at 80° C. for the first 2 hours and the temperature then raised to about 100° C. for two more hours. The curing rate can be further accelerated by increasing the temperature.

Tests were conducted on the cured products of Examples 1 through 13 to determine the electrical properties as determined by the dielectric constant, dissipation factor, and volume resistivity, tensile strength and other physical properties of the elastomeric products of this invention, for comparison with the product of Example 14 which omitted from the prepolymer the polyfunctional isocyanate group derived from the reaction product of aniline and formaldehyde. The physical properties listed in Table I below were obtained from standard size ASTM slabs aged for at least 7 days at room temperature. The specific curing compositions employed with the prepolymers are listed in Table I. All the prepolymers were cured at an NCO/OH ratio of 1/1.

TABLE I

| | Example No. | | | | | | |
|---|---|---|---|---|---|---|---|
| | 1 | 2 | 3 | 4 | 5 | 6 | 7 |
| Prepolymer (parts by weight) | 100 | 85.9 | 92.95 | 92.95 | 100 | 100 | |
| Curing agent (parts by weight): | | | | | | | |
|   Propylene glycol monoricinoleate | 64 | 64 | 64 | 74.05 | | | |
|   Pentaerythritol monoricinoleate | 18 | 18 | 18 | 18 | | | |
|   Estynox 140 [1] | 18 | 18 | 18 | 18 | | | |
|   Polypropylene glycol (M.W. 400) | | 14.1 | | | | | |
|   Polypropylene ether of glycerol (M.W. 400) | | | | | 23 | 23 | 23 |
|   DB Castor oil | | | 7.05 | | 77 | 77 | 77 |
| Electrical properties: | | | | | | | |
|   Volume resistivity (25° C., ohm-cm.) | $3\times10^{14}$ | $2\times10^{14}$ | $4\times10^{14}$ | $6\times10^{15}$ | $3\times10^{13}$ | $1\times10^{14}$ | (²) |
|   Dielectric constant (25° C., 1 kc.) | 2.89 | 2.89 | 2.80 | 2.98 | 2.95 | 2.94 | (²) |
|   Dissipation factor (25° C., 1 kc.) | .023 | .026 | .018 | .032 | .027 | .025 | (²) |
| Physical properties: | | | | | | | |
|   Hardness, Shore A (after 10 seconds) | 89 | 88 | 87 | 87 | 85 | 75 | (²) |
|   Tensile strength, p.s.i. | 2,300 | 2,250 | 2,100 | 2,400 | 1,900 | 1,450 | (²) |
|   Elongation at break, percent | 120 | 120 | 120 | 120 | 100 | 110 | (²) |

| | Example No. | | | | | | |
|---|---|---|---|---|---|---|---|
| | 8 | 9 | 10 | 11 | 12 | 13 | 14 |
| Prepolymer (parts by weight) | 100 | 100 | 100 | 100 | 100 | 100 | 72.5 |
| Curing agent (parts by weight): | | | | | | | |
|   Propylene glycol monoricinoleate | 64 | 64 | 64 | | | | 64 |
|   Pentaerythritol monoricinoleate | 18 | 18 | 18 | | | | 18 |
|   Estynox 140 [1] | 18 | 18 | 18 | | | | 18 |
|   Polypropylene glycol (M.W. 400) | | | | | | | |
|   Polypropylene ether of glycerol (M.W. 400) | | | | 23 | | 23 | |
|   DB Castor oil | | | | 77 | | 77 | |
| Electrical properties: | | | | | | | |
|   Volume resistivity (25° C., ohm-cm.) | $7\times10^{14}$ | $6\times10^{15}$ | $2\times10^{15}$ | $1\times10^{13}$ | $5\times10^{13}$ | $3\times10^{13}$ | $3\times10^{14}$ |
|   Dielectric constant (25° C., 1 kc.) | 3.32 | 3.05 | 2.99 | 3.23 | 3.16 | 2.95 | 3.60 |
|   Dissipation factor (25° C., 1 kc.) | .081 | .037 | .039 | .039 | .045 | .032 | 0.105 |
| Physical properties: | | | | | | | |
|   Hardness, Shore A (after 10 seconds) | 70 | 51 | 76 | 75 | 77 | 79 | 45 |
|   Tensile strength, p.s.i. | 1,870 | 1,550 | 1,950 | 1,350 | 1,500 | 1,650 | 1,030 |
|   Elongation at break, percent | 200 | 205 | 100 | 110 | 90 | 100 | 250 |

[1] Available from the Baker Castor Oil Co.
[2] Viscosity too high to obtain measurements.

The results in Table I demonstrate the significantly improved tensile strength resulting from the use of a polyfunctional isocyanate derived from the reaction of aniline and formaldehyde. Compare tensile strength of elastomers of Examples 1 through 13 with Example 14. Furthermore, there was a significant improvement as to Shore A hardness in those compositions where a polyfunctional isocyanate is included. In addition, the electrical properties as determined by the dissipation factor, dielectric constant and volume resistivity of the elastomeric products of the present invention are at least as good as, and in most cases significantly superior to, the properties exhibited by the elastomer of Example 14.

The data in Table I also demonstrate that where the viscosity of the prepolymer is too high, a useful elastomer cannot be obtained such as in the case of Example 7. Also significant is the fact that in those examples (Examples 1–4, 8 and 10) where both the tolylene diisocyanate and the polyfunctional isocyanate derived from the reaction of aniline and formaldehyde are present, best results are obtained as regards the tensile strength.

Also significant is the fact that the physical and electrical properties of the elastomer obtained from the prepolymer of Example 1 and the elastomers obtained from those prepolymers (Examples 2–4) in which at least one of the polyols used in the prepolymer of Example 1 has been left out but included in the curing composition, are essentially the same. This indicates that the final composition is most significant.

While at the data in Table I do not establish a specific correlation between the functionality of the polyfunctional isocyanate and the dielectric constant and dissipation factor, there is at least substantial evidence that with higher functionality, one gets a lower dielectric constant and dissipation factor.

The examples cited herein are exemplary of the invention and it is to be understood that other modifications are within the skill of the art. The scope of the invention is defined by reference to the claims.

What is claimed is:

1. A prepolymer composition comprising the reaction product obtained from (a) about 10 to 50 parts by weight of an arylene diisocyanate, (b) about 10 to 70 parts by weight of a polyfunctional isocyanate having a viscosity between about 5 and 600 cps. at room temperature and a functionality between 2.0 and about 2.8 and an isocyanate equivalent weight between 75 and 250, said polyfunctional isocyanate being derived from the reaction of aniline and formaldehyde, and (c) at least one polyol selected from the class consisting of a polyhydric alcohol ester of a hydroxy carboxylic acid of at least twelve carbon atoms, the total amount of polyol present in said prepolymer not exceeding a weight which will reduce the isocyanate to hydroxyl equivalent weight ratio below about 2:1, said prepolymer composition having a viscosity not greater than about 50,000, said prepolymer composition being obtained by first reacting said arylene diisocyanate and said polyol and thereafter adding to said reaction product said polyfunctional isocyanate.

2. A prepolymer according to claim 1, wherein the polyfunctional isocyanate has an equivalent weight of between about 125 and 145 and a viscosity between about 30 and 300 cps.

3. A prepolymer composition according to claim 1, wherein the arylene diisocyanate comprises tolylene diisocyanate.

4. A prepolymer composition according to claim 3, wherein the polyol comprises castor oil and a polyhydric alcohol monoester of a hydroxy carboxylic acid of at least twelve carbon atoms, said polyhydric alcohol being selected from the class consisting of an alkylene glycol and a polyalkylene glycol.

5. A prepolymer composition according to claim 3, wherein the polyol comprises castor oil and a glycol or polyglycol monoester of a hydroxy carboxylic acid of at least twelve carbon atoms, said polyhydric alcohol being selected from the class consisting of an alkylene glycol and a polyalkylene glycol.

6. A prepolymer composition according to claim 3, wherein the polyol is castor oil and a polyalkylene glycol.

7. A prepolymer according to claim 3, wherein the polyol is a polyalkylene glycol and a polyhydric alcohol monoester of a hydroxy carboxylic acid of at least twelve carbon atoms, said polyhydric alcohol being selected from the class consisting of an alkylene glycol and a polyalkylene glycol.

8. A prepolymer according to claim 3 wherein the polyol is an alkylene glycol monoester of a hydroxy carboxylic acid of at least twelve carbon atoms.

9. A prepolymer according to claim 8, wherein the alkylene glycol monoester is the propylene glycol monoester of a hydroxy carboxylic acid of at least twelve carbon atoms.

10. A prepolymer composition according to claim 9, wherein said ester is propylene glycol monoricinoleate.

11. A prepolymer composition comprising the reaction product obtained from (a) about 10 to about 50 parts by weight tolylene diisocyanate, (b) about 10 to about 70 parts by weight of a low viscosity polyfunctional isocyanate having a functionality between about 2.3 and about 2.8 and an isocyanate equivalent weight between about 125 and 145, said polyfunctional isocyanate being derived from the reaction product of aniline and formaldehyde, and (c) at least one polyol selected from the class consisting of (1) zero to about 15 parts by weight of an alkylene glycol or polyalkylene glycol monoester of a hydroxy carboxylic acid of at least twelve carbon atoms, (2) zero to about 15 parts by weight castor oil, and (3) zero to about 30 parts by weight of a polyalkylene glycol having a molecular weight between about 200, and 2000, at least one said polyols being a member selected from the class defined in (c)(1) and (c)(2); the total amount of polyol present in said prepolymer not exceeding a weight which will reduce the isocyanate to hydroxyl equivalent weight ratio below about 2:1, and said prepolymer having a viscosity between about 100 cps. and 5,000 cps., said prepolymer composition being obtained by first reacting said tolylene diisocyanate and said polyol and thereafter adding to said reaction product said polyfunctional isocyanate.

12. A prepolymer according to claim 11, wherein the polyfunctional isocyanate is a polymethylene polyphenyl isocyanate having a viscosity between 30 and 300 cps.

13. A prepolymer according to claim 11, wherein the polyol comprises castor oil, propylene glycol monoricinoleate and a polypropylene glycol.

14. A prepolymer according to claim 11, wherein the polyol comprises castor oil and propylene glycol monoricinoleate.

15. A prepolymer according to claim 11, wherein the polyol comprises propylene glycol monoricinoleate and polypropylene glycol.

16. A prepolymer according to claim 13, wherein the castor oil and propylene glycol monoricinoleate each comprise about seven parts by weight of the prepolymer, the polypropylene glycol and the tolylene diisocyanate comprises about 22 parts by weight of the prepolymer.

17. An elastomeric product comprising the cured reaction product of (1) a prepolymer comprising the product of the reaction of (a) about 10 to about 50 parts by weight of an arylene diisocyanate, (b) about 10 to about 70 parts by weight of a low viscosity polyfunctional isocyanate having a functionality of between about 2.3 and about 2.8 and an isocyanate equivalent weight of between 75 and 250, said polyfunctional isocyanate being derived from the reaction of aniline and formaldehyde, (c) at least one polyol consisting of a polyhydric alcohol ester of a hydroxy carboxylic acid of at least twelve carbon atoms; the total amount of polyol present in said prepolymer not exceeding a weight ratio which will reduce the isocyanate to hydroxyl equivalent weight below about 2:1, said prepolymer composition having a viscosity not greater than about 50,000 cps., said prepolymer composition being obtained by first reacting said arylene diisocyanate and said polyol and thereafter adding to said reaction product said polyfunctional isocyanate; and (2) a curing agent comprising at least one compound containing two or more active hydrogen groups.

18. An elastomeric production according to claim 17, wherein the curing agent is selected from the class consisting of glycol monoesters of hydroxy carboxylic acids of at least twelve carbon atoms, polyglycol monoesters of hydroxy carboxylic acids of at least twelve carbon atoms, castor oil, esters of polyhydric alcohols containing at least four hydroxy groups and an aliphatic acid of at least twelve carbon atoms and at least one hydroxy group per molecule, polyalkylene glycols, polyesters, polyamides, and mixtures of said curing agents.

19. An elastomeric product according to claim 18, wherein the arylene diisocyanate comprises tolylene diisocyanate and wherein the polyfunctional isocyanate has an isocyanate equivalent weight of between about 125 and 145.

20. An elastomeric product according to claim 19 wherein the polyol in the prepolymer is at least one material selected from the class consisting of castor oil, an alkylene glycol monoester of a hydroxy carboxylic acid of at least twelve carbon atoms, a polyalkylene glycol monoester of a hydroxy carboxylic acid of at least twelve carbon atoms, and a polyalkylene glycol.

21. An elastomeric product according to claim 20, wherein the polyol comprises castor oil, a polyalkylene glycol and an alkylene glycol monoester of a hydroxy carboxylic acid of at least twelve carbon atoms.

22. An elastomeric product according to claim 20, wherein the polyol comprises castor oil and a polyalkylene glycol.

23. An elastomeric product according to claim 20, wherein the polyol comprises a polyalkylene glycol and an alkylene glycol monoester of a hydroxy carboxylic acid of at least twelve carbon atoms.

24. An elastomeric product according to claim 20, wherein the curing agent comprises about 10 to about 90 parts by weight of a glycol monoester of a hydroxy carboxylic acid of at least twelve carbon atoms, and zero to about 40 parts by weight of an ester of a polyhydric alcohol containing at least four hydroxy groups and an aliphatic acid of at least twelve carbon atoms and at least one hydroxy group per molecule.

25. An elastomeric product according to claim 24, wherein the alkylene glycol monoester of a hydroxy carboxylic acid of at least twelve carbon atoms comprises propylene glycol monoricinoleate and the ester of a polyhydric alcohol containing at least four hydroxy groups comprises pentaerythritol monoricinoleate.

26. An elastomeric product comprising the cured reaction product of (1) a prepolymer comprising the product of the reaction of (a) about 10 to about 50 parts by weight tolylene diisocyanate, (b) about 10 to 70 parts by weight of a low viscosity of polyfunctional isocyanate having a functionality between about 2.3 and about 2.8 and an isocyanate equivalent weight of between about 125 and 145, said polyfunctional isocyanate being derived from the reaction product of aniline and formaldehyde, and (c) (1) zero to about 15 parts by weight of at least one polyol selected from the class consisting of an alkylene glycol or polyalkylene glycol monoester of a hydroxy carboxylic acid of at least twelve carbon atoms, (2) zero to about 15 parts by weight castor oil and (3) zero to about 30 parts by weight of a polyalkylene glycol having a molecular weight of between 200 and 2000, at least one said polyol being a member selected from the class defined in (c) (1) and (c) (2); the total amount of polyol present in said prepolymer not exceeding a weight which will reduce the isocyanate to hydroxyl equivalent weight ratio below about 2:1, and said prepolymer having a viscosity between about 100 cps. and 5,000 cps., said prepolymer composition being obtained by first reacting said tolylene diisocyanate and said polyol and thereafter adding to said reaction product said polyfunctional isocyanate; and (2) a curing agent comprising at least one member selected from the class consisting of propylene glycol monoricinoleate, castor oil, pentaerythritol monoricinoleate, ethylene glycol monoricinoleate and glyceryl monoricinoleate.

27. An elastomeric product according to claim 26, wherein the polyfunctional isocyanate is a polymethylene polyphenyl isocyanate having a viscosity between 30 cps. and 300 cps.

28. An elastomeric product according to claim 26, wherein the curing agent comprises about 10 to 90 parts by weight propylene glycol monoricinoleate, zero to about 40 parts by weight pentaerythritol monoricinoleate, and zero to about 40 parts by weight polypropylene glycol.

29. An elastomeric product according to claim 28, wherein the curing composition comprises propylene glycol monoricinoleate and pentaerythritol monoricinoleate.

30. An elastomeric product according to claim 28, wherein said curing composition also includes an epoxidized soybean oil.

References Cited

UNITED STATES PATENTS

| | | | |
|---|---|---|---|
| 3,391,101 | 7/1968 | Kelly et al. | 260—37 |
| 3,380,967 | 4/1968 | Lowe et al. | 260—77.5 |
| 3,362,921 | 1/1968 | Ehrlich et al. | 260—18 |
| 3,345,311 | 10/1967 | Ehrlich et al. | 260—18 |
| 3,341,463 | 9/1967 | Gemeinhardt | 260—77.5 X |
| 3,201,136 | 8/1965 | Harrison et al. | 260—77.5 X |

OTHER REFERENCES

Rubber Age, "Low Durometer Cast Urethane Elastomers," Heiss, vol. 88, pp. 89–97, October 1960.

DONALD E. CZAJA, Primary Examiner

C. W. IVY, Assistant Examiner

U.S. Cl. X.R.

260—75, 77.5, 13, 858, 404.5

PO-1050
(5/69)

UNITED STATES PATENT OFFICE
CERTIFICATE OF CORRECTION

Patent No. 3,483,150            Dated   Dec. 9, 1969

Inventor(s) ARTHUR EHRLICH, JOHN W. HAYES, TEMPLE C. PATTON

It is certified that error appears in the above-identified patent and that said Letters Patent are hereby corrected as shown below:

Column 2, delete lines 53 through 59 and substitute therefor --isocyanate equivalent weight of between about 75 and 250, preferably between about 125 and 145. These materials which are commercially available are derived from the reaction of aniline and formaldehyde. Illustrative of these polyfunctional isocyanates are polymethylene polyphenyl isocyanates having a functionality between about 2.3 and 2.8 and a modified methylene bis phenyl isocyanate--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents